(12) United States Patent
Schulze et al.

(10) Patent No.: US 12,342,831 B2
(45) Date of Patent: Jul. 1, 2025

(54) APPARATUS AND METHOD FOR DETACHING MEAT STRIPS LOCATED ON A BREASTBONE CREST OF A POULTRY CARCASS

(71) Applicant: Nordischer Maschinenbau Rud. Baader GmbH + Co. KG, Lübeck (DE)

(72) Inventors: Adrian Schulze, Lübeck (DE); Andreas Landt, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 0 days.

(21) Appl. No.: 18/682,328

(22) PCT Filed: Jan. 27, 2022

(86) PCT No.: PCT/EP2022/051900
§ 371 (c)(1),
(2) Date: Feb. 8, 2024

(87) PCT Pub. No.: WO2023/016671
PCT Pub. Date: Feb. 16, 2023

(65) Prior Publication Data
US 2025/0000107 A1    Jan. 2, 2025

(30) Foreign Application Priority Data
Aug. 11, 2021 (WO) ............... PCT/EP2021/072400

(51) Int. Cl.
*A22C 21/00* (2006.01)

(52) U.S. Cl.
CPC ...... *A22C 21/0069* (2013.01); *A22C 21/0053* (2013.01)

(58) Field of Classification Search
CPC ............ A22C 21/0023; A22C 21/0069; A22C 21/003; A22C 21/0046
(Continued)

(56) References Cited

U.S. PATENT DOCUMENTS

| 4,682,386 | A |   | 7/1987 | Hazenbroek |   |
| 5,545,083 | A | * | 8/1996 | Bargele | .............. A22C 21/0069 452/136 |

(Continued)

FOREIGN PATENT DOCUMENTS

WO    2008118008 A1    10/2008

*Primary Examiner* — Richard T Price, Jr.
(74) *Attorney, Agent, or Firm* — DINSMORE & SHOHL LLP

(57) ABSTRACT

An apparatus is for detaching meat strips, which are located on a breastbone crest of a poultry carcass, from poultry carcasses of slaughtered poultry bodies or parts thereof which are already freed from breast fillets. The apparatus has a circulating conveyor having at least one holding apparatus with a support body for receiving and holding the poultry bodies/parts during transport in a transport direction, and at least one processing station along a conveying path of the conveyor. One processing station is a detaching unit for detaching the meat strips from the breastbone crest. The detaching unit has a pre-detaching element and a detaching element. The pre-detaching element is cuts into the meat strip in a region of a breastbone horn of the breastbone crest which leads in the transport direction and the detaching element grips and peels the meat strip off the breastbone crest. A corresponding method is provided.

50 Claims, 6 Drawing Sheets

(58) Field of Classification Search
USPC .......................................................... 452/135
See application file for complete search history.

(56) References Cited

U.S. PATENT DOCUMENTS

| | | |
|---|---|---|
| 8,845,401 B2 | 9/2014 | Willem et al. |
| 2004/0132395 A1* | 7/2004 | Van Den Nieuwelaar ................... A22C 21/003 452/165 |

* cited by examiner

APPARATUS AND METHOD FOR DETACHING MEAT STRIPS LOCATED ON A BREASTBONE CREST OF A POULTRY CARCASS

CROSS-REFERENCE TO RELATED APPLICATIONS

This application is the U.S. National Stage of PCT/EP2022/051900 filed on Jan. 27, 2022, which claims priority to European Patent Application PCT/EP2021/072400 filed on Aug. 11, 2021, the entire content of both are incorporated herein by reference in their entirety.

FIELD OF THE INVENTION

The invention relates to an apparatus, configured and adapted for detaching meat strips, which are located on a breastbone crest of a poultry carcass, from poultry carcasses of slaughtered poultry bodies or parts thereof which are already freed from breast fillets, comprising a circulating conveyor having at least one holding apparatus with a support body for receiving and holding the poultry bodies or the parts thereof during transport by the apparatus in transport direction T, and at least one processing station along a conveying path of the conveyor, one of the processing stations being configured as a detaching unit for detaching the meat strips from the breastbone crest.

Furthermore, the invention relates to a method for detaching meat strips, which are located on a breastbone crest of a poultry carcass, from poultry carcasses of slaughtered poultry bodies or parts thereof which are already freed from breast fillets, comprising the steps: Feeding the poultry carcass along a conveying path in transport direction T into the region of a detaching unit for detaching the meat strip, the poultry carcass being held during transport in transport direction T on a support body of a holding apparatus for holding the poultry carcass during transport and during processing, the longitudinal axis $L_{SK}$ of the support body being oriented parallel to the transport direction T, and detaching of the meat strip during transport along or through the detaching unit.

BACKGROUND OF THE INVENTION

Such apparatuses and methods are used in the poultry processing industry in order to achieve a high yield in meat extraction during the filleting process on the one hand, and a breastbone or parts thereof, namely in particular the cartilage, that is as clean as possible on the other hand. After detaching and removing the breast fillets, i.e. in particular the outer and inner breast fillets, from the carcass, residual meat generally remains on the carcass which, on the one hand, is located laterally on the breastbone and is detached from the carcass, for example, by means of scraping tools. On the other hand, during the extraction of individual fillets, a meat strip remains centrally on the breastbone, namely on the breastbone crest, which occurs in particular when the breast fillets are cut from the carcass separately from each other. Due to the separate separating incisions for obtaining the two breast fillets, the centrally placed meat strip initially remains on the carcass which is why it is also referred to as the central strip. The residual meat, with the membrane that lies between the meat and the bone/cartilage of the breastbone, forms the central strip which extends along the breastbone crest into the region of the breastbone horn.

As mentioned, this central strip occurs during the processing of poultry bodies or parts thereof, wherein the parts thereof describe in particular "front halves" and breast caps of the poultry bodies. Loosening of the meat strips/central strips describes pre-detachment and at least partial detachment as well as complete detachment, i.e. also and in particular complete separation of the meat strip from the breastbone crest.

With the methods and apparatuses known to date for removing the residual meat forming the central strip, which is still on the carcass in the region of the breastbone crest after pre-detaching and severing the breast fillets, removal is optionally manual or automated by means of mechanical tools. In the known solutions, rollers are provided for removing the central strip. Two rollers running in opposition to each other are driven in circulation, interlocking each other using drive means. The two rollers grip the central strip and peel it off the breastbone crest. This solution, however, has a number of disadvantages. On the one hand, it is complicated and expensive to produce interlocking rollers. On the other hand, drive means are necessary which also lead to an increase in the cost of the apparatus. However, one very decisive disadvantage is that the quality and/or the yield of the residual meat obtained is/are insufficient as, due to different sizes of the poultry bodies or parts thereof to be processed, the rollers sometimes detach parts of the bone/cartilage of the breastbone at the same time in the case of larger poultry bodies or parts thereof and thus contaminate the residual meat and possibly render it unusable or, in the case of smaller poultry bodies or parts thereof, sometimes they do not detach or do not completely detach the residual meat, as the rollers only partially come into contact with the residual meat or do not come into contact with it at all. It is very complex to implement adaptation to different sizes of poultry bodies.

Thus the object of the invention is to create a simple apparatus which ensures gentle and reliable removal of the meat strips/central strips from the breastbone crest for poultry bodies of different sizes. The object is further to propose a corresponding method.

SUMMARY OF THE INVENTION

This object is achieved by the apparatus with the features referred to hereinbefore in that the detaching unit comprises a pre-detaching element and a detaching element, the pre-detaching element being configured and adapted to cut into the meat strip in the region of a breastbone horn of the breastbone crest which leads in transport direction T and the detaching element is configured and adapted to grip and peel the meat strip off the breastbone crest. The solution according to the invention ensures gentle and reliable removal of the meat strips/central strips from the breastbone crest for poultry bodies of different sizes, in that separate work steps for pre-detaching, on the one hand, and detaching, on the other hand, can be implemented without the pre-detaching element being directly in engagement with the detaching element.

The pre-detaching element and the detaching element can be combined in a common combination tool, the functionalities (for pre-detaching and detaching) of the combination tool being configured spatially one after the other for performing the pre-detaching step and a subsequent detaching step. A preferred embodiment is characterised in that the pre-detaching element and the detaching element are separate tools which are configured and adapted to carry out separate work steps that can be performed one after the other and are arranged one behind the other in transport direction T. This embodiment of the apparatus according to the invention ensures gentle detachment of the residual meat from the breastbone crest of poultry bodies in a particularly reliable and simple manner, in that the residual meat is pre-detached with a first simple and therefore inexpensive tool and the pre-detached meat is detached with a second simple and therefore inexpensive tool. Detachment describes predominantly or completely peeling off the meat strip. By allocating the individual work steps to different tools, these tools can be produced easily and cost-efficiently. Furthermore, allocating the work steps to two tools and having tools which operate free from interlocking ensures gentle harvesting of the residual meat from the breastbone crest. The embodiment according to the invention with two tools for pre-detaching and detaching the residual meat also simplifies adaptation of the tools to different sizes of the poultry bodies to be processed. This further supports the advantages described previously. The spatial separation of the two tools, which are coordinated with each other in terms of control technology but have no direct operative connection with each other, ensures clean and gentle detachment of the meat strip.

Advantageously, the pre-detaching element and the detaching element are arranged on a—preferably common—main body, the detaching element being arranged downstream of the pre-detaching element in transport direction T. This guarantees a simple and inexpensive construction. Optionally, the tools can also be arranged directly on a housing, a frame or the like of the apparatus. However, an arrangement of the tools on the main body is preferable, such that the tools or the detaching unit can also be retrofitted in a modular manner. In this case, each tool can be assigned to its own main body. Arrangement of the tools on a common main body is, however, particularly preferable.

An advantageous embodiment is characterised in that the support body is preferably configured to be rotatable about an axis of rotation $D_{SK}$, which is oriented essentially transverse to the transport direction T, and has a position in the region of the detaching unit in which the longitudinal axis $L_{SK}$ of the support body is oriented parallel to the transport direction T. In other words, the support body with the poultry carcass arranged thereon enters the region of the tools in the longitudinal direction, such that the breastbone with the breastbone crest also points in the transport direction in its longitudinal direction. The possibility of rotating the support body provides the simple and reliable option of finally and completely detaching the meat strip still gripped by the detaching element from the breastbone, namely in particular of stripping it off. By rotating the support body, the process of detaching the meat strip can be shortened if necessary and, above all, completed, particularly in the event that the detaching element has to be returned to its starting position due to narrow gaps between the holding apparatuses for processing the next poultry body. Particularly preferably, the holding apparatus is configured to be rotatable, the rotation of which also causes the support body to be rotated at the same time.

In a particularly preferable embodiment, the apparatus is characterised in that the pre-detaching element comprises a pivot lever on the free end of which a blade is arranged, the pivot lever being mounted on the main body such that it can pivot about a pivot axis SAE on the main body. The pivot lever can be straight. Preferably, however, the pivot lever is curved. This hook shape of the pivot lever ensures that the blade arranged on the free end strikes the breastbone horn in a targeted and precise manner. In other words, the pivot lever with the blade is configured and arranged in such a manner that, when the poultry carcasses are transported past, the cutting edge of the blade directly strikes the attachment of the meat strip in the region of the breastbone horn and cuts into and levers or lifts up the meat strip in order to position the free and detached end of the meat strip for the subsequent detaching element. The blade itself is preferably configured to be linear and has a sharpened cutting edge on the side directed towards the meat strip to be processed/cut into.

Advantageously, the blade is releasably attached to the pivot lever. This ensures easy replaceability, e.g. when the blade is worn. The blade can be attached to the pivot lever, e.g. by means of a screw connection, clamping or other quick-action locking system.

A particularly advantageous development is characterised in that the pivot lever is spring-loaded against an adjustable abutment in a starting position, in such a manner that the breastbone of the poultry carcasses transported by means of the conveyor along the transport path in transport direction T inevitably comes into engagement with the pivot lever which is in the starting position and its blade arranged thereon. This ensures safe pre-detachment of the meat strip. After the poultry carcass has been transported out of engagement with the pre-detaching element, the spring tension ensures that the pivot lever quickly and automatically returns to its starting position. Using the adjustable abutment, the starting position can be varied for different size ranges to always provide the optimum point of impact of the blade on the breastbone horn. The spring tension and thus the spring force is also optionally adjustable or can be varied by replacing the spring element. The magnitude of the spring force is an important parameter for reliably cutting into the meat strip. Instead of a spring element, actively controllable elements, for example pneumatic drives, can also be used to move the pivot lever, or even separate blades for cutting into the meat strip, into engagement with the breastbone horn and out of engagement therewith.

Particularly preferably, the blade on the free end of the pivot lever is oriented in the starting position of said pivot lever at an angle β to the poultry carcass to be processed, in such a manner that the tip of the blade is directed towards the breastbone horn. The correct angle β, along with the spring force, is an important parameter for precisely cutting into the meat strip on the breastbone horn.

Expediently, the angle β enclosed between the longitudinal axis $L_{SK}$ of the support body and the longitudinal axis Lx of the blade is greater than 0° and less than 90° and is preferably between 20° and 60° and particularly preferably is approximately 45°. On the one hand, this angular position of the blade with respect to the breastbone horn ensures that the blade or its cutting edge strikes the breastbone horn at an ideal point. On the other hand, the angular position ensures that the incised free end of the meat strip is levered or raised up in such a manner that the subsequent detaching element can reliably grip this free end.

A particularly preferable embodiment is characterised in that the pivotably mounted and spring-loaded pivot lever is configured to be deflectable against the spring force in a product-controlled manner. Due to this simple embodiment, detachment of the meat strips works reliably and precisely for poultry bodies of different sizes, such that the detached meat strips are free of bone and/or cartilage components of the breastbone in the case of larger poultry bodies or parts thereof, and the meat strips are reliably and completely harvested in the case of smaller poultry bodies or parts thereof. Due to the product control, the product (namely the poultry carcass) "finds" the tool for pre-detaching the meat strip regardless of size and controls the tool itself.

A preferred embodiment is characterised in that the detaching element comprises gripping tongs with a pair of tong jaws and a deflector element, the gripping tongs being positioned upstream of the deflector element in transport direction T. The gripping tongs are configured and adapted for gripping and holding the free end of the meat strip cut into by the pre-detaching element. The deflector element is configured and adapted for deflecting the gripping tongs. The claimed arrangement of gripping tongs and deflector element one behind the other ensures that the free end of the meat strip can first be gripped and clamped before the poultry carcass comes into contact with the deflector element in order to detach the clamped meat strip from the breastbone by pulling it in the longitudinal direction of the latter. The embodiment according to the invention ensures detachment of the meat strips in a simple and reliable manner regardless of the size of the poultry body or parts thereof to be processed. The detaching element can also be configured in a different manner as long as it is configured and adapted to hold the free end of the meat strip tightly and peel it off the breastbone crest.

Advantageously, the detaching element is mounted pivotably about a pivot axis SGA on the main body. In a simple manner, the pivotable mounting of the detaching element ensures a relative movement between the detaching element and the poultry carcass to be processed, by means of which detachment of the gripped or clamped meat strip is easily and reliably ensured. Instead of the pivotable mounting, it is also possible to implement other relative movements between detaching element and poultry carcass, and they can be product-controlled and/or actively controlled, e.g. by pneumatic drives.

Particularly preferably, the detaching element is spring-loaded against an adjustable abutment in a starting position in such a manner that the breastbone of the poultry carcasses transported by means of the conveyor along the transport path in transport direction T inevitably comes into engagement with the detaching element which is in the starting position. As a result, this initiates and executes the relative movement between detaching element and poultry carcass in a product-controlled manner. When the poultry carcass runs with its breastbone against the detaching element, the detaching element is deflected out of the transport path of the breastbone against the spring force, resulting in a detaching force, preferably a tensile force, acting on the residual meat. After the poultry carcass has been transported out of engagement with the detaching element, the spring tension ensures that the detaching element quickly and automatically returns to its starting position. Using the adjustable abutment, the starting position can be varied for different size ranges to always provide the optimum point of contact of the detaching element with the poultry carcass. The spring tension and thus the spring force is also optionally adjustable or can be varied by replacing the spring element. Instead of a spring element, actively controllable elements, for example pneumatic drives, can also be used to execute the relative movement.

Advantageously, the pivotably mounted and spring-loaded detaching element is configured to be deflectable against the spring force in a product-controlled manner. This ensures reliable detachment or peeling off of the meat strip regardless of size.

A particularly preferred embodiment is characterised in that the deflector element is mounted on the main body, such that it can pivot about the pivot axis $S_{GA}$, and the pair of tong jaws is mounted on the deflector element, such that it can pivot about pivot axes $S_{ZB}$ with respect to the deflector element, the pivot axes $S_{ZB}$ of the tong jaws being oriented substantially transverse to the pivot axis $S_{GA}$ of the deflector element. The gripping tongs are arranged on the deflector element. For this purpose, the deflector element comprises a deflector arm and a deflector head. The tong jaws are mounted pivotably on the deflector arm which is itself mounted pivotably on the main body. On the free end of the deflector arm, the deflector head extends at an angle towards the breastbone to be processed in order to ensure that the breastbone runs onto it. The two tong jaws are arranged upstream of the deflector element or, more precisely, upstream of the deflector head in transport direction T so as to be able to grip/clamp the pre-detached meat strip before the breastbone reaches the deflector head. Despite the clamped meat strip, the tong jaws only clamp and hold the meat strip, the breastbone is transported through the tong jaws and thus increasingly deflects the deflector element out of the conveying path of the poultry carcasses.

Advantageously, the gripping tongs are associated with a pneumatic drive for pneumatically closing and opening the tong jaws, it being possible to execute the pivoting movements of the tong jaws towards and away from each other with respect to the deflector element. The gripping tongs wait with opened tong jaws until the tip of the breastbone, i.e. the breastbone horn with the pre-detached meat strip, enters between the tong jaws. These are then closed in a pneumatically-driven manner. Peeling of the meat strip starts because the poultry carcass is transported onward, while the gripping tongs are stationary in transport direction T. Due to the onward transport, the breastbone strikes against the deflector element which deflects pivotably and assists and accelerates peeling, since the meat strip is additionally pulled away from the breastbone.

Particularly preferably the two tong jaws have profiling on their inner surfaces directed towards each other, the profiling being preferably formed from a longitudinal section of the inner surfaces, in such a manner that profiled grooves in the starting position of the detaching element extend substantially parallel to the longitudinal axis $L_{SK}$ of the support body or substantially parallel to the transport direction T. This profiling ensures that, on the one hand, a high clamping effect on the meat strip is guaranteed and, on the other hand, it facilitates transporting or sliding of the breastbone through the tong jaws located in the clamping position. The inner surfaces are preferably selected to be large and wide so that there is a time window in which the clamping can take place. In other words, the tong jaws are selected to be so wide that the time or time window for moving into the clamping position is more freely selectable and this ensures that the loose end of the meat strip is gripped.

Optionally, a flap element is provided which is spring-loaded and arranged along the transport path in such a manner that it can be brought into engagement with the meat strip already partially peeled off the breastbone crest. The flap standing in the conveying path of the poultry carcasses finally and completely separates the almost completely detached meat strips, which are still held by the gripping tongs, from the breastbone. The flap thereby exerts an additional pressure on the meat strip to be detached which contributes to complete separation of the meat strip. The product can be configured to be product-controlled, e.g. against the spring force or actively controlled, e.g. by means of a pneumatic drive.

Advantageously, the pivot axes $S_{AE}$ of the pre-detaching element and $S_{GA}$ of the detaching element are oriented transverse to the transport direction T. The pivot axes $S_{AE}$ and $S_{GA}$ preferably run parallel to each. In this case, the pivot axis $S_{GA}$ of the deflector element is downstream of the pivot axis $S_{AE}$ of the pre-detaching element in transport direction T and transverse to transport direction T, preferably closer to the poultry carcass to be processed than the pivot axis $S_{AE}$ of the pre-detaching element.

A further preferred embodiment is characterised in that the detaching element comprises two clamping jaws, at least one of the clamping jaws being configured to be movable with respect to the second clamping jaw. This provides a simple and cost-effective tool for final and complete detachment of the meat strip without the need for active control means.

Advantageously, a first clamping jaw is configured to be fixed and stationary, and the second clamping jaw is configured to be movable with respect to the first clamping jaw. Both clamping jaws, however, can also be configured to be movable. However, a particularly simple and effective embodiment of the detaching element is one in which one clamping jaw is configured to be fixedly connected to a housing, a frame or the like or is formed integrally therewith, while the second clamping jaw is movable with respect to the first clamping jaw, namely, for example, pivotable, tiltable, rotatable or, for example, also adjustable in a superimposed linear and pivoting movement. This allows the meat strip which is to be detached to be reliably picked up, held and ultimately stripped away from the breastbone crest.

A preferred development of this embodiment is characterised in that the or each movable clamping jaw is held by means of at least one spring element under spring tension in a receiving position for receiving the breastbone crest between the two clamping jaws, the movable clamping jaw being configured and adapted to be deflectable with respect to the fixed clamping jaw against the spring force of the spring element in a product-controlled manner. The detaching element according to the invention can dispense with active control means. The or each movably configured clamping jaw can be controlled alone in a product-controlled manner. In the variant in which the one clamping jaw is configured to be stationary and the other clamping jaw is movable, the stationary, preferably lower, clamping jaw forms a fixed support for the breastbone crest, while the movable, preferably upper, clamping jaw presses the breastbone crest onto the stationary clamping jaw. The breastbone, which can be inserted between the two clamping jaws, is thus securely guided. Due to the spring tension, the upper clamping jaw is configured to be deflectable in a product-controlled manner and thus enables adaptation to the breastbone crest, in particular to its size, thickness, length, outline and the like. The embodiment and arrangement of the clamping jaws described ensures even and adapted contact of the two clamping jaws on the breastbone crest, it being possible to guide the breastbone crest between the two clamping jaws in parallel alignment with the transport direction T.

Various clamping bodies, which are configured and adapted to grip and hold the meat strip or parts thereof, are suitable as clamping jaws. Advantageously, the two clamping jaws are formed by two separate sheet metal bodies which, in order to form a gap for receiving the breastbone crest, are arranged with their thin edges opposite each other in such a manner that a breastbone of the poultry carcass, which is transported parallel to the transport direction T, can be introduced into the gap on a breastbone appendage between the breastbone crest and a breastbone web. The sheet metal bodies have a low thickness compared to their flat extension. Thus, cutting edges of the sheet metal bodies form the thin (front) edges. In the receiving position, in which the sheet metal bodies are still waiting for the insertion of a breastbone crest, these thin edges of the two sheet metal bodies lie on top of each other, at most with a gap having a gap dimension preferably less than 1 mm.

In a preferred embodiment, the clamping jaws or the sheet metal bodies are configured and adapted in such a manner that, in the receiving position, they are shaped so as to expand counter to the poultry bodies or parts thereof entering in transport direction T. The clamping jaws or sheet metal bodies form, by means of a shaping or recess, a feed-in area running towards each other in a funnel shape in transport direction T, by means of which the breastbone or the breastbone crest can be securely and reliably inserted into the gap. The clamping jaws or sheet metal bodies accordingly have a greater gap between them in their receiving position in the feed-in area than in a clamping area downstream of the feed-in area.

The movable clamping jaw or the movable sheet metal body is configured and adapted to be rotatable about an axis of rotation D from a receiving position to a holding position and back. The movable clamping jaw or movable sheet metal body is configured in the shape of a bracket or handle as a clamping bracket and is attached to a rotatable shaft. The spring element, which is clamped between the clamping bracket and a housing part, frame or the like, holds the clamping bracket in the receiving position.

Advantageously, the axis of rotation D of the movable clamping jaw or the movable sheet metal body, and in particular also of the shaft, is oriented parallel to the transport direction T of the incoming poultry bodies or parts thereof, in such a manner that the compensating or adjusting movement of the clamping bracket takes place upwards or downwards, respectively, with respect to the transport direction T. If a breastbone crest has been inserted into the gap between the sheet metal bodies, the clamping bracket is deflected upwards. After the breastbone crest has been transported out of the detaching element, the spring element causes the clamping bracket to be pulled back towards the stationary clamping jaw.

A preferred embodiment of the detaching element is characterised in that the clamping jaws or the sheet metal bodies are oriented in transport direction T of the incoming poultry bodies or the parts thereof with a first portion substantially parallel to the transport direction T and parallel to the breastbone appendage between the breastbone crest and the breastbone web, while at least one second portion is oriented at an angle β to the transport direction T and to the breastbone appendage between the breastbone crest and the breastbone web with β>0 running away from a transport path defined by transport direction T of the poultry bodies or parts thereof. If the sheet metal bodies in the first portion are still parallel to the breastbone appendage, the distance increases in the second portion preferably continuously. As a result, the breastbone crest is moved out of the gap between the sheet metal bodies at least from the second portion onwards as it is transported further, while the meat strip is "caught" by the sheet metal bodies and ultimately stripped off the breastbone crest. The breastbone appendage extends along an imaginary line which is oriented parallel to the transport direction T.

Advantageously, a third portion of the clamping jaws or the sheet metal bodies is oriented at an angle α to the transport direction T and to the breastbone appendage between the breastbone crest and the breastbone web with α>β running away from the transport path, the first and second and third portions of a clamping jaw or a sheet metal body being each arranged one behind the other in transport direction T and being integrally connected to each other. The three portions of a clamping jaw or of a sheet metal body accordingly form a guide for the breastbone crest on the one hand and a stripping guide for detaching the meat strip from the breastbone crest on the other hand. More than three portions can also be provided at a variable angle to the transport direction T and the breastbone appendage.

Expediently, the two clamping jaws or sheet metal bodies forming the detaching element are configured to extend in alignment in transport direction T.

Expediently, the spring force of the pre-detaching element and/or the spring force of the detaching element is configured to be adjustable, whereby individual adjustment is implemented so as to be able to obtain the meat strips in a yield-efficient manner.

An expedient development is characterised in that further processing stations may be or are configured as a scoring unit for scoring the skin, as a skinning unit for removing the skin, as a sinew separating unit, as a unit for separating the wishbones, as a filleting unit for detaching and separating the breast fillets from the poultry carcass, as a unit for recovering remainders of meat located laterally on the breastbone and as a unit for recovering parts of the breastbone which also comprise the cartilaginous regions of the breastbone or parts thereof. Thus, ultimately a complete filleting machine is described and claimed, it being possible to vary and supplement the number and/or selection of the processing stations. The embodiment according to the invention ensures particularly efficient and gentle processing of the poultry bodies or parts thereof with maximum yield, irrespective of product size.

Particularly preferably, the apparatus comprises a control unit which is configured and adapted to control the conveyor, including the holding apparatus comprising the support body and the or each processing station. This supports the advantages previously described, in particular it also ensures automated processing.

The object is also achieved by a method having the steps referred to hereinbefore in that the meat strip is detached from the breastbone crest of the poultry carcass by means of the detaching unit in two separate and successive steps. On the one hand, the steps, which are coordinated with each other but carried out separately in terms of time and space, enable simple and therefore inexpensive tools to be used and, on the other hand, make it possible for the meat strips to be detached easily and reliably from the breastbone. The two-stage manner of removing the meat strip further simplifies the processing of poultry bodies of different sizes.

In a first pre-detaching step, the meat strip is pre-detached in the region of a breastbone horn of the breastbone preceding in transport direction T, in that the membrane on the breastbone horn located between the meat and the breastbone is cut into, while, in a second pre-detaching step, the free end of the meat strip cut into is gripped and peeled off the breastbone crest in the longitudinal direction thereof. Cutting into it results in a free end of the meat strip which can then easily be gripped and peeled off.

Advantageously, for the pre-detaching step, the incision in the meat strip is made in the region of the breastbone horn to pre-detach the meat strip using a blade at an acute angle β, which is formed between a longitudinal axis $L_{SK}$ of a support body carrying the poultry carcass and a longitudinal axis LK of a blade making the incision. The blade strikes the breastbone horn with a sharpened cutting edge, creating the loose end which is lifted by the blade. This preparatory step simplifies subsequent gripping and peeling off of the meat strip. The pre-detachment, however, can also be carried out by the gripping tongs themselves, in that a sharp edge of the gripping tongs pre-detaches the meat strip before the gripping tongs clamp and peel off the pre-detached meat strip.

A preferred development is characterised in that, in its starting position, the blade is brought into engagement with the breastbone horn by transporting the poultry carcass in transport direction T, the blade is then guided in a product-controlled manner, wherein the pressure of the blade on the breastbone horn increases due to the further transport in transport direction T, and the blade is moved back to its starting position as soon as the blade is out of engagement with the poultry carcass due to the further transport in transport direction T. Due to the blade being guided in a product-controlled manner, poultry bodies of different sizes can be processed with consistently high quality.

Expediently, the blade is deflected via a pivot lever against a spring tension by the breastbone of the poultry carcass in order to be moved out of engagement by the spring tension back to its starting position against an abutment. As a result, after the incision the pivot lever with the blade is automatically back in a position to "receive" the next poultry body.

A particularly preferred embodiment is characterised in that, for the detaching step to detach the already pre-detached meat strip, the free end thereof is clamped between two tong jaws of gripping tongs, and the clamped meat strip is peeled at least partially from the breastbone crest in the longitudinal direction by a product-controlled deflector element. Due to the fact that the gripping tongs are stationary in transport direction T, further transport of the poultry carcass in transport direction T results in the gripped meat strip being peeled from the breastbone crest due to the relative movement. The product-controlled deflector element causes the gap between the gripping tongs and the breastbone crest to increase, thus assisting and accelerating the peeling off. This method preferably leads to complete detachment of the meat strip. In individual cases, it can be difficult to completely detach the meat strip as the poultry carcass subsequently transported in "forces" the gripping tongs to return to their open starting position. For these cases, the invention provides additional accelerating steps for complete detachment which are described below.

Advantageously, the tong jaws of the gripping tongs are closed and opened by means of a pneumatic drive, the gripping tongs in their clamping position being moved away from the breastbone in a product-controlled manner via the deflector element. The pneumatic drive enables fast and precise closing and opening of the tong jaws.

Advantageously, the gripping tongs or the two tong jaws are actively controlled closed and open along the conveying path depending on the position of the support body carrying the poultry carcass.

For this purpose, the tong jaws of the gripping tongs wait in an open standby position along the conveying path until the tip of the breastbone, in the form of the breastbone horn with the pre-detached meat strip, enters the open gripping tongs, in order to then move the tong jaws in a pneumatically-controlled manner into their clamping position to clamp the free end of the meat strip. Due to the configuration of the gripping tongs or the tong jaws, the clamping, i.e. closing of the tong jaws can also take place in a time window. The control can be carried out via a control system to which, for example, in addition to drives of a circulating conveyor, sensors for monitoring the position of the poultry bodies along the conveying path and/or other detection and/or measuring means for detecting and/or calculating the respective position of the breastbone of the poultry body are connected.

Preferably, the closed gripping tongs clamping the meat strip are moved away from the breastbone in a product-controlled manner during transport in transport direction T, in that the spring-loaded deflector element is deflected by the breastbone as soon as the breastbone reaches the deflector element until the meat strip is at least partially detached from the breastbone crest. Then, after at least partial detachment of the meat strip, the tong jaws are actively opened and the detaching element formed of gripping tongs and deflector element is moved in a spring-loaded manner to its standby position with tong jaws open. The detached meat strips can be removed and further processed.

As already described, the meat strip is preferably completely detached from the breastbone by the previous method steps. In the event that, the pre-detaching element, on the one hand, and in particular the detaching element, on the other hand, have to be moved back to their starting position more quickly before the meat strip is completely detached as a result of tight timing of the holding apparatuses with the poultry carcasses arranged thereon which are transported in transport direction T, complete detachment can be accelerated with the meat strip still clamped, i.e. the process can be shortened, by rotating the support body with the meat strip still clamped in the gripping tongs about an axis of rotation $D_{SK}$, which is oriented transverse to the transport direction T, out of an alignment in which said support body is oriented with its longitudinal axis $L_{SK}$ parallel to the transport direction T of the holding apparatuses for pre-detaching and peeling off the meat strip, in order to strip the pre-detached and at least partially detached meat strip completely from the poultry carcass. In other options, the already partially pulled off meat strip can be completely detached by a flap or the like which is "in the way" of the poultry carcass to be processed along the conveying path. The flap exerts additional pressure on the meat strip and assists and accelerates the detachment.

To detach the already pre-detached meat strip, the poultry carcass can be inserted with the breastbone crest between two clamping jaws. Specifically, the poultry carcass is inserted with the region of a breastbone appendage between the breastbone crest and a breastbone web parallel to the transport direction T into a gap formed between two sheet metal bodies as clamping jaws so that the sheet metal bodies are located between the pre-detached meat strip and the breastbone web. This results in a spatial separation of meat strips on the one hand and breastbone web on the other, so that the breastbone crest can follow a different transport path, namely continuing in transport direction T, than the meat strip which is pushed diagonally outwards and away from the breastbone crest by the clamping jaws and is ultimately prevented from being transported further.

For this purpose, during transport of the poultry carcass in transport direction T, the pre-detached meat strip is initially moved by the sheet metal bodies towards a free edge of the breastbone crest and is ultimately stopped in transport direction T so that during further transport of the poultry carcass in transport direction T, the meat strip is held out of the detaching unit and completely stripped off the breastbone crest.

While the breastbone crest is transported along between the clamping jaws or the sheet metal bodies, at least one sheet metal body is moved away from the second sheet metal body in a product-controlled manner so that the sheet metal bodies form a gap between them and rest on the breastbone appendage on both sides of the breastbone crest, wherein the gap between the two sheet metal bodies closes and holds the meat strip as soon as the breastbone crest leaves the detaching unit.

The sheet metal bodies therefore prevent the meat strips from being transported further in transport direction T. When the breastbone crest has completely left the detaching unit, the detached meat strips hang trapped between the sheet metal bodies. The meat strips held by the sheet metal bodies and completely detached from the breastbone are each pressed out of the holder by subsequently detached meat strips and transported away. For this purpose, the meat strips can drop into a transport crate, e.g. via a chute.

Especially preferably, the method is carried out using an apparatus as described herein. The advantages arising from this have already been described in detail in connection with the apparatus, which is why reference will be made to the relevant passages to avoid repetitions.

BRIEF DESCRIPTION OF THE DRAWINGS

Further expedient and/or advantageous features and developments of the apparatus and the method emerge from the description. Especially preferred embodiments are explained in greater detail with reference to the attached drawing. The drawing shows.

DETAILED DESCRIPTION OF THE INVENTION

Figure 1:
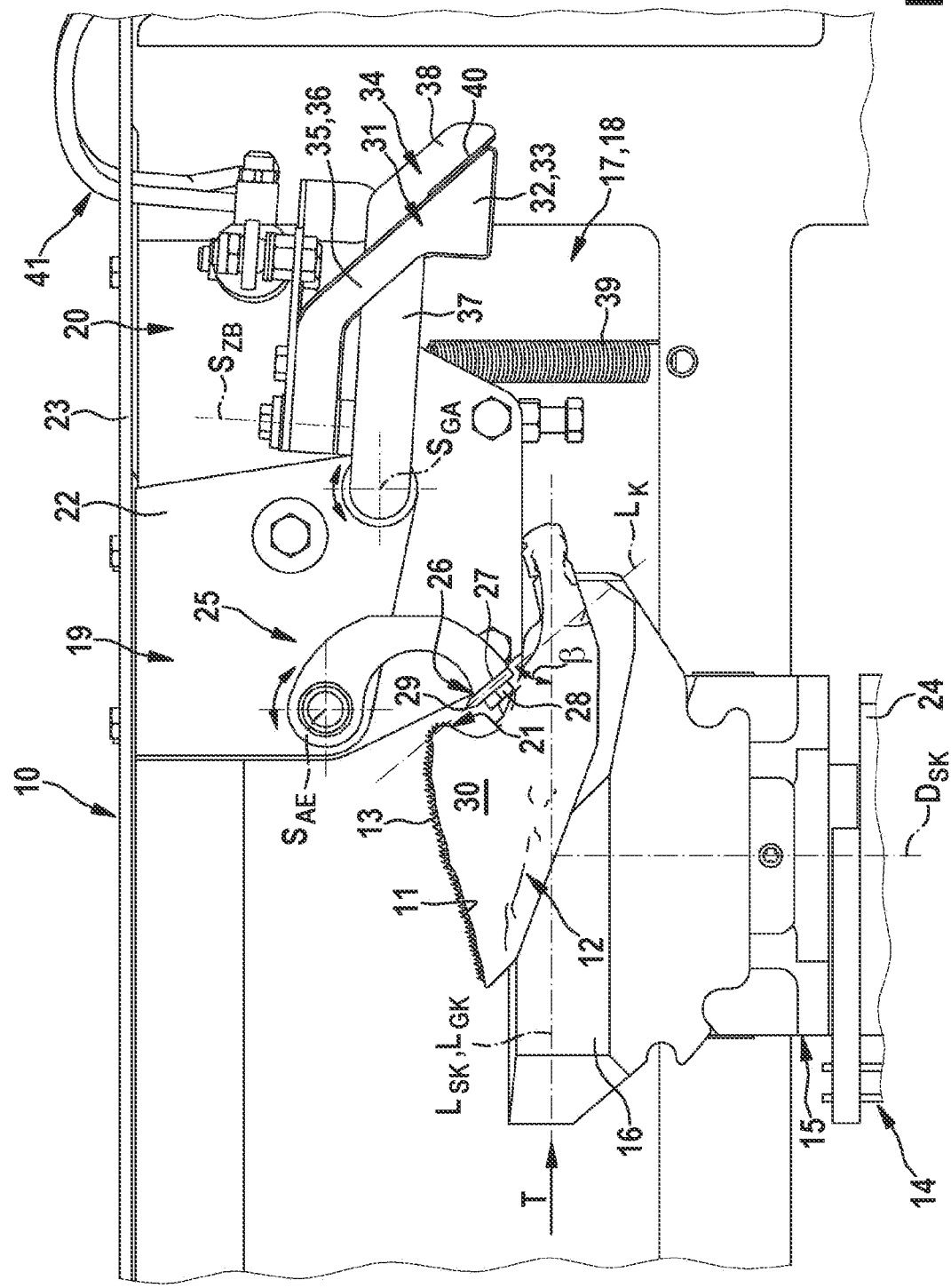
FIG. 1 a schematic representation of a preferred embodiment of an apparatus according to the invention in a view from below.

The apparatus shown in the drawing is used for processing breast caps of slaughtered poultry bodies, namely in particular for detaching meat strips, which are located on a breastbone crest of a poultry carcass, from poultry carcasses of slaughtered poultry bodies or parts thereof which are already freed from breast fillets. In a corresponding manner, the apparatus is also used for processing front halves of slaughtered poultry bodies or other parts of slaughtered poultry bodies still including the breastbone.

The invention relates to an apparatus 10, configured and adapted for detaching meat strips 13, which are located on a breastbone crest 11 of a poultry carcass 12, from poultry carcasses 12 of slaughtered poultry bodies or parts thereof which are already freed from breast fillets, comprising a circulating conveyor (14) having at least one holding apparatus 15 with a support body 16 for receiving and holding the poultry bodies or the parts thereof during transport by the apparatus 10 in transport direction T, and at least one processing station 17 along a conveying path of the conveyor 14, wherein one of the processing stations 17 is configured as a detaching unit 18 for detaching the meat strips 13 from the breastbone crest 11.

This apparatus 10 is characterised according to the invention in that the detaching unit 18 comprises a pre-detaching element 19 and a detaching element 20, the pre-detaching element 19 being configured and adapted to cut into the meat strip 13 in the region of a breastbone horn 21 of the breastbone crest 11 which leads in transport direction T and the detaching element 20 being configured and adapted to grip and peel the meat strip 13 off the breastbone crest 11.

When taken on their own or in combination with each other, the features and developments described below illustrate preferred embodiments of the apparatus 10. It is expressly pointed out that features which are summarised in the description and/or the drawing or are described in a common embodiment can also further develop the apparatus 10 described above in a functionally independent manner.

The conveyor 14 is preferably a continuous conveyor chain which is guided around deflecting elements. The deflecting elements can be configured as drive and/or guide bodies. The deflecting elements are rotatable about axes of rotation, it being possible for the axes of rotation to vary in orientation. For example, the axes of rotation can be oriented horizontally so that the conveyor chain forms an upper run and a lower run. In the embodiment shown, the axes of rotation are oriented inclined to the vertical. A large number of holding apparatuses are preferably arranged on the conveyor chain at a defined distance from each other.

Figure 2:
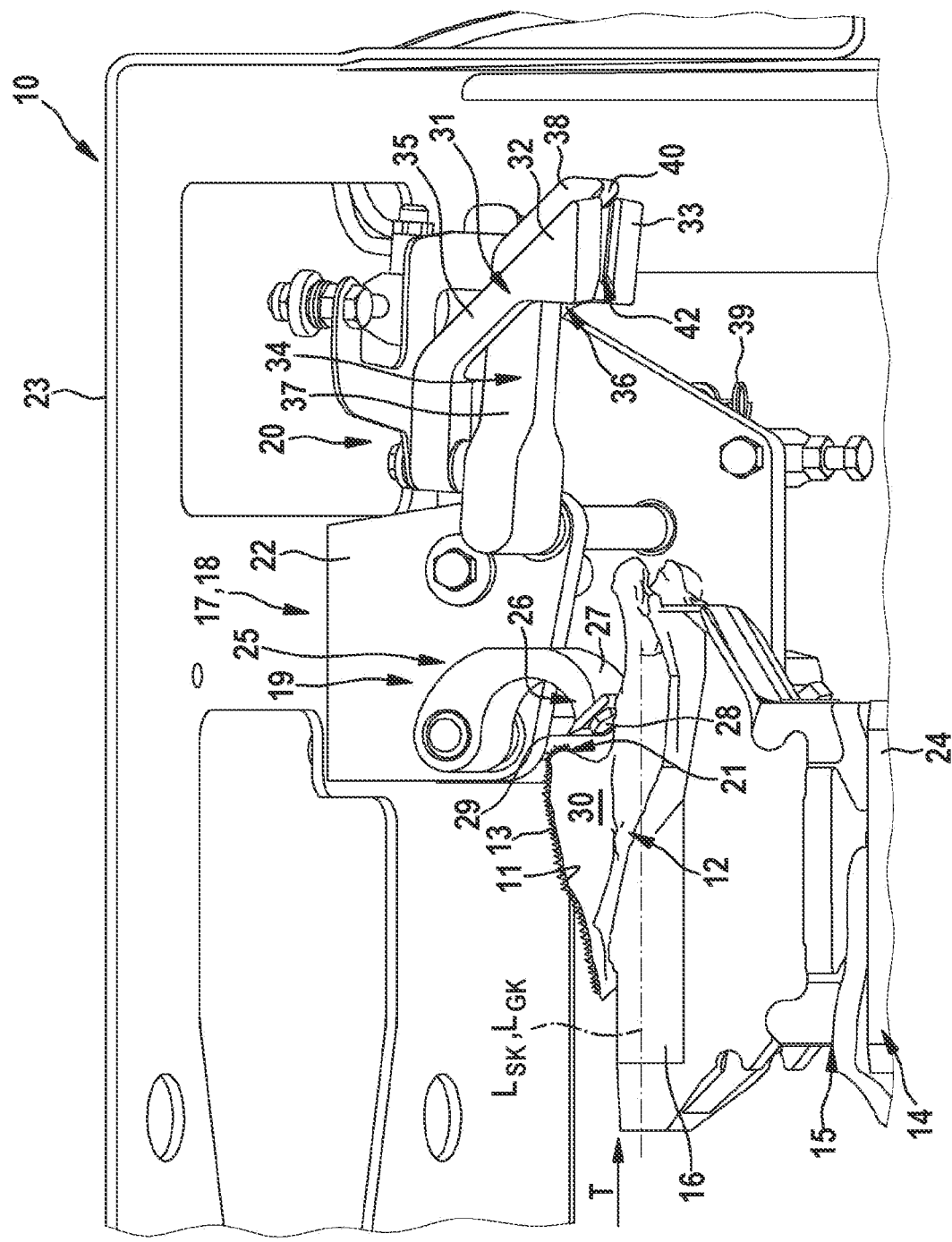
FIG. 2 the apparatus according to FIG. 1 in a view at an angle from below.
Figure 3:
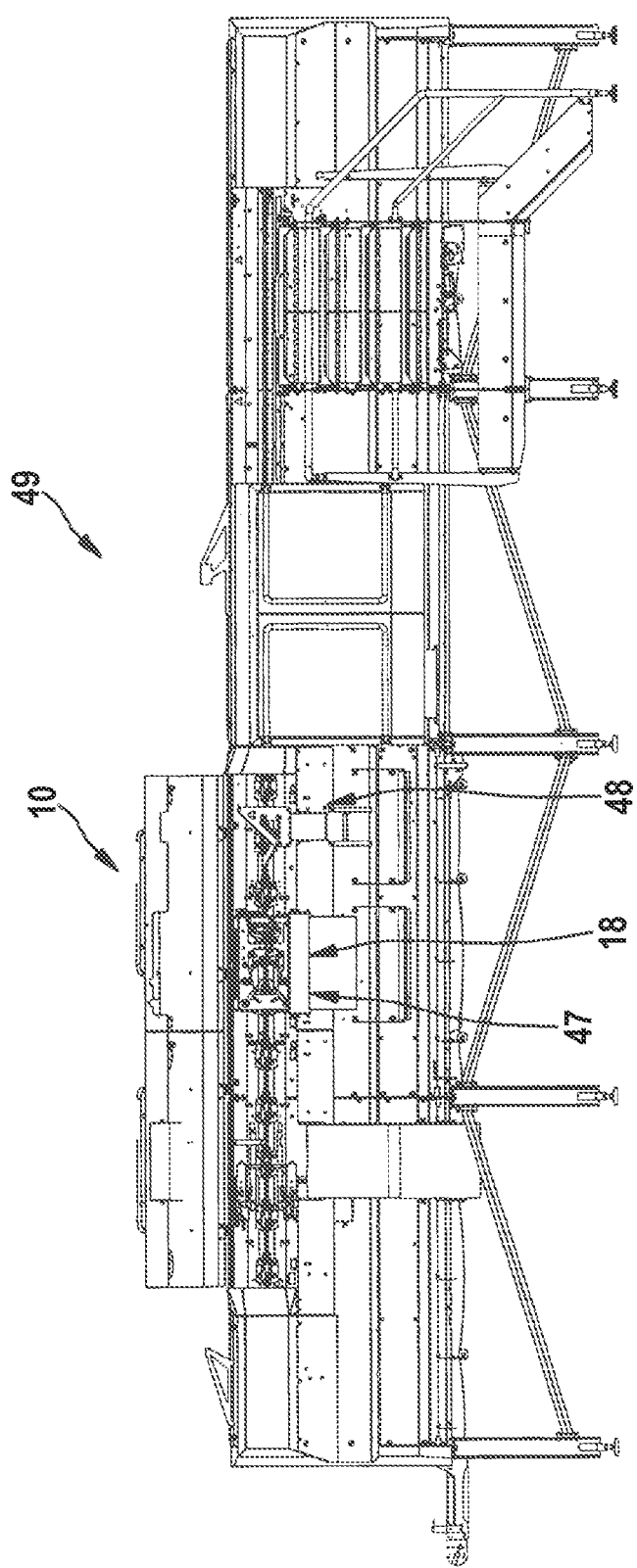
FIG. 3 a schematic representation of a complete system for processing poultry bodies with an apparatus according to the invention in a view from the rear.
Figure 4:
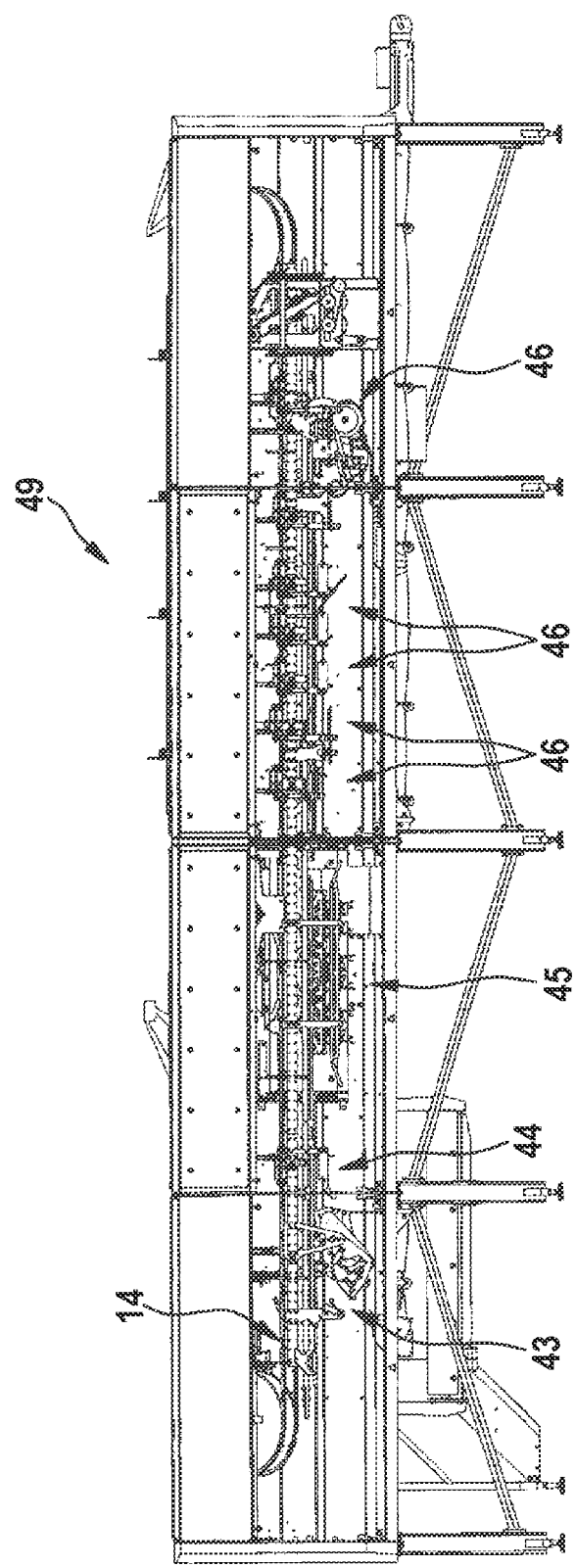
FIG. 4 a schematic representation of a complete system for processing poultry bodies with an apparatus according to the invention in a view from the front.

As shown in FIGS. 1 and 2, in the preferred embodiment, the pre-detaching element 19 and the detaching element 20 are separate tools which are configured and adapted to carry out separate work steps that can be performed one after the other. In other embodiments, the pre-detaching element 19 and the detaching element 20 can also be configured as a common combination tool. In the embodiment shown, the pre-detaching element 19 and the detaching element 20 are arranged on a common main body 22, the detaching element 20 being arranged downstream of the pre-detaching element 19 in transport direction T. The main body 22 is releasably attached to a frame 23, housing or the like of the apparatus 10. The detaching unit 18 is arranged on the frame 23 in such a manner that the tools, i.e. the pre-detaching element 19 and the detaching element 20, protrude into the conveying path such that holding apparatuses 15 entering the work area of the detaching unit 18 inevitably bring the poultry carcasses 12 into contact with the tools.

The holding apparatuses 15 with the support bodies 16 basically have an orientation in which the poultry carcasses 12 held on the support bodies 16 are transported through the detaching unit 18 in their longitudinal direction. At the latest when the holding apparatuses 15 enter the work area of the detaching unit 18, the longitudinal axis $L_{SK}$ of the support body 16 (and thus also the longitudinal axis $L_{GK}$ of the poultry carcass 12) is oriented parallel to the transport direction T, such that the meat strip 13 to be detached is also in a longitudinal extension parallel to the transport direction T. To change the orientation of the holding apparatuses 15 with the support bodies 16, the support body 16 is configured to be rotatable—directly or indirectly—preferably about an axis of rotation $D_{SK}$, which is oriented substantially transverse to the transport direction T. In the region of the detaching unit 18, the support body 16 has a position, at least at the beginning of processing, in which the longitudinal axis $L_{SK}$ of the support body is oriented parallel to the transport direction T. In the course of processing, a change of orientation is ensured even in the detaching unit 18 itself, preferably in that the holding apparatus 15 is configured to be rotatable with respect to a conveyor chain 24 of the conveyor 14 by means of suitable actuating or drive means.

The pre-detaching element 19 comprises a pivot lever 25, on the free end 26 of which a blade 27 is arranged. The pivot lever 25 is curved, preferably almost semi-circular, so that the hook-shaped pivot lever 25 protrudes into the conveying path of the poultry carcasses 12 with its free end 26. The blade 27, which is linear in the embodiment shown, is releasably attached to the free end 26 of the pivot lever 25 by means of a bolt 28. The blade 27 has a sharpened cutting edge 29 at its end directed opposite the transport direction T. The pivot lever 25 is mounted with the blade 27 on the main body 22 such that it can pivot about a pivot axis $S_{AE}$. The pivot axis $S_{AE}$ is preferably oriented transverse to the transport direction T.

In FIGS. 1 and 2, the pivot lever 25 is in its starting position. In the starting position, the pivot lever 25 is spring-loaded—preferably by a spring element not explicitly shown—against an adjustable abutment, which is also not explicitly shown, in such a manner that the breastbone 30 of the poultry carcasses 12 transported by means of the conveyor 14 along the conveying path in transport direction T inevitably comes into engagement with the pivot lever 25 which is in the starting position and its blade 27 arranged thereon. More precisely, the poultry carcass 12 strikes the cutting edge 29 of the blade 27 with its breastbone horn 21 during further transport in transport direction T.

The blade 27 on the free end 26 of the pivot lever 25 is aligned in the starting position of said pivot lever at an angle β to the poultry carcass 12 to be processed, in such a manner that the tip, i.e. the sharpened cutting edge 29, of the blade 27 is directed towards the breastbone horn 21. The angle β or its size is variable and can be changed, for example, by means of the adjustable abutment. The angle β enclosed between the longitudinal axis $L_{SK}$ of the support body 16 and the longitudinal axis Lx of the blade 27 is greater than 0° and less than 90° and is preferably between 20° and 60° and particularly preferably is approximately 45°.

The pivotably mounted and spring-loaded pivot lever 25 is configured to be deflectable against the spring force in a product-controlled manner. As soon as the cutting edge 29 of the blade 27 is in contact with the breastbone horn 21, further transport in transport direction T inevitably leads to deflection of the pivot lever 25. Due to the fact that the cutting edge 29 in the view according to FIGS. 1 and 2 engages the breastbone horn 21 obliquely from below, further transport in transport direction T results, on the one hand, to the pressure of the cutting edge 29 into the meat strip 13 increasing in the region of the breastbone horn 21, such that the meat strip 13 is pre-detached from the breastbone crest 11 with a then free end. On the other hand, the cutting edge 29 levers the loose end of the meat strip 13 upwards during further transport so that the loose end can easily be gripped. As soon as the contact between poultry carcass 12 and pre-detaching element 19 is ended by further transport of the poultry carcass 12 in transport direction T, the pre-detaching element 19 automatically moves back to the starting position due to the spring force. The spring force of the pre-detaching element 19 is adjustable, e.g. by replacing the spring element or by other means.

In a first embodiment, the detaching element 20 comprises gripping tongs 31 with a pair of tong jaws 32, 33 and a deflector element 34, the gripping tongs 31 being positioned upstream of the deflector element 34 in transport direction T. The positioning relates to the functional parts of gripping tongs 31 and deflector element 34 which come into contact with the poultry carcass. The detaching element 20 is mounted as a unit on the main body 22 such that it can pivot about a pivot axis $S_{GA}$. The pivot axis $S_{GA}$ of the detaching element 20 is oriented substantially transverse to the transport direction T. The pivot axis $S_{GA}$ of the detaching element 20 is downstream of the pivot axis $S_{AE}$ of the pre-detaching element 19 in transport direction T. Transverse to the transport direction T, the distance between the pivot axis $S_{GA}$ of the detaching element 20 and the support body 16 is smaller than the distance between the pivot axis $S_{AE}$ of the pre-detaching element 19 and the support body 16.

The gripping tongs 31 comprise two gripping arms 35, 36. One tong jaw 32, 33, each, is arranged on the free end of each of the two gripping arms 35, 36. The deflector element 34 comprises a deflector arm 37 and a deflector head 38. The deflector head 38 is arranged offset on the deflector arm 37 in such a manner that the deflector head 38 protrudes further into the conveying path than the deflector arm 37. The deflector head 38 is transverse to the transport direction T at approximately the level of the tong jaws 32, 33. The tong jaws 32, 33 of the gripping tongs 31 are upstream of the deflector head 38 of the deflector element 34 in transport direction T. In the event that the pre-detaching element 19 and the detaching element 20 are formed by a combination tool, the gripping tongs 31 also assume the functionality of the pre-detaching element 19, in that the gripping tongs 31 have a sharp edge or the like on the inlet side of the poultry carcass, by means of which the incision can be implemented before the tong jaws 32, 33 are moved into their clamping position. In other developments, the gripping tongs 31 can be configured to "bite" in such a way that the incision is performed during the clamping process.

The detaching element 20 is spring-loaded against an adjustable abutment (not explicitly shown) in a starting position, in such a manner that the breastbone 30 of the poultry carcasses 12 transported by means of the conveyor 14 along the transport path in transport direction T inevitably comes into engagement with the detaching element 20 which is in the starting position. The spring tension is generated by a spring element 39 which is configured to be optionally replaceable. The pivotably mounted and spring-loaded detaching element 20 is configured to be deflectable against the spring force in a product-controlled manner. As soon as the contact between poultry carcass 12 and detaching element 20 is ended by further transport of the poultry carcass 12 in transport direction T, the detaching element 20 automatically moves back to the starting position due to the spring force. The spring force of the detaching element 20 is adjustable, e.g. by replacing the spring element or by other means.

Preferably, the deflector element 34 of the detaching element 20 is mounted on the main body 22 such that it can pivot about the pivot axis $S_{GA}$ and the pair of tong jaws 32, 33 is mounted on the deflector element 34 such that it can pivot about pivot axes $S_{ZB}$ with respect to the deflector element 34, the pivot axes $S_{ZB}$ of the tong jaws 32, 33 being oriented substantially transverse to the pivot axis $S_{GA}$ of the deflector element 34. Specifically, in the embodiment shown, the deflector arm 37 is pivotably mounted on the main body 22. The offset deflector head 38 is arranged on the free end of the deflector arm 37. The deflector head 38 has an inclined contact surface 40 onto which the poultry carcass 12 runs with its breastbone 30. The gripping tongs 31 are mounted pivotably on the deflector arm 37 with their gripping arms 35, 36. The offset tong jaws 32, 33 are arranged on the free end of the gripping arms 35, 36. The tong jaws 32, 33 and the deflector head 38 form the functional parts of gripping tongs 31 and deflector element 34.

A pneumatic drive 41 for pneumatically opening and closing the tong jaws 32, 33 is associated with the gripping tongs 31, it being possible to execute the pivoting movements of the tong jaws 32, 33 towards each other and away from each other with respect to the deflector element 34 and the deflector arm 37 respectively. The gripping arms 35, 36 can be pivoted about the pivot axes $S_{ZB}$ by means of the pneumatic drive 41. The two tong jaws 32, 33 have profiling 42 on their inner surfaces directed towards each other, the profiling 42 being preferably formed from a longitudinal section of the inner surfaces, in such a manner that profiled grooves in the starting position of the detaching element 20 extend substantially parallel to the longitudinal axis $L_{SK}$ of the support body 16 or substantially parallel to the transport direction T.

In an embodiment which is not shown, a flap element is provided which is spring-loaded and arranged along the transport path in such a manner that it can be brought into engagement with the meat strip 13 already partially peeled off the breastbone crest 11.

Figure 5:
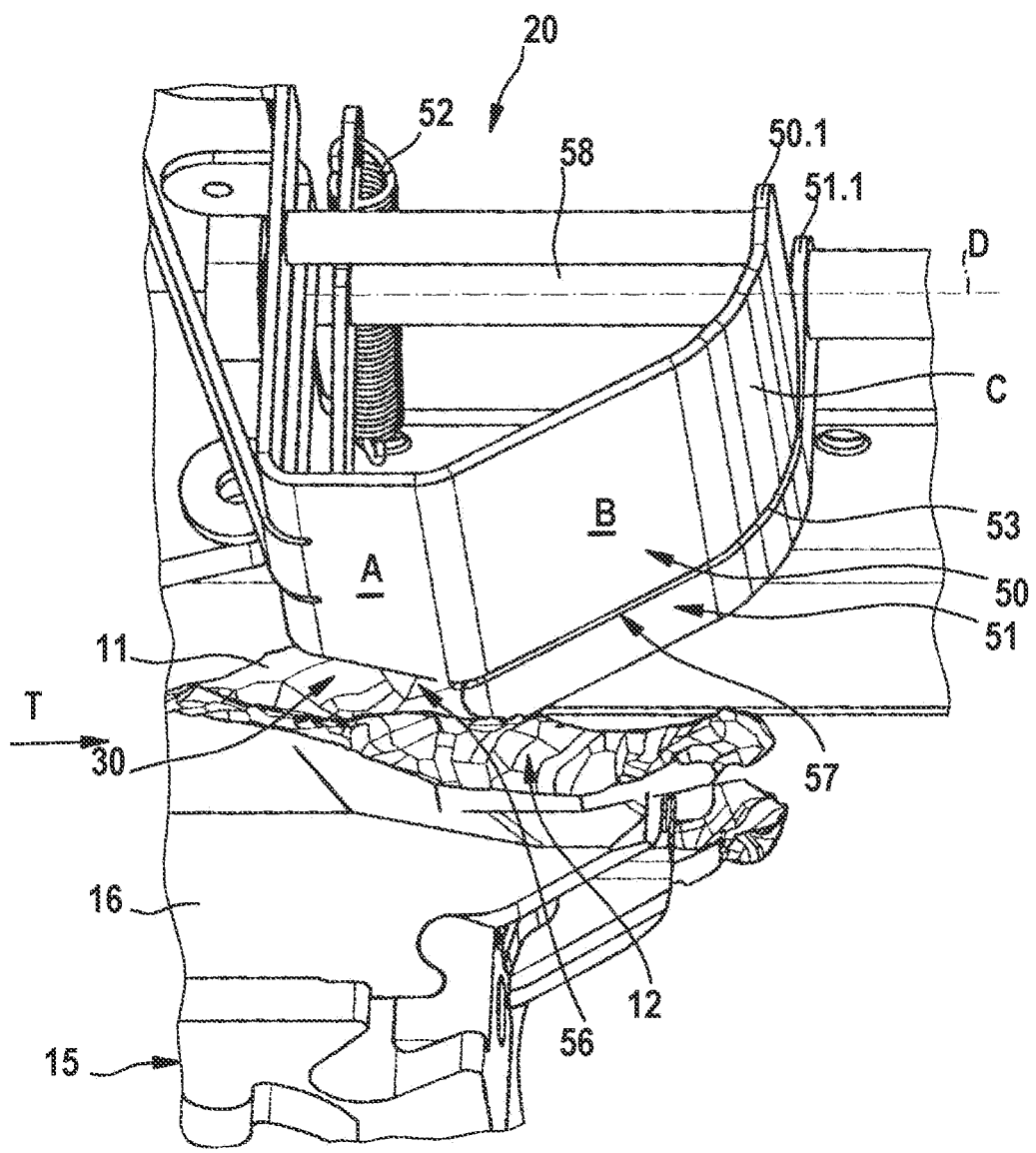
FIG. 5 a schematic representation of an alternative detaching element in a perspective view.

In a second embodiment, the detaching element 20 comprises two clamping jaws 50, 51, at least one of the clamping jaws 51 being configured to be movable with respect to the second clamping jaw 50. In the embodiment shown in FIG. 5, a first clamping jaw 50, namely a lower clamping jaw 50, is configured to be fixed and stationary. The fixed clamping jaw 50 can be part of a housing, the frame 23 or the like or can be attached thereto. The second clamping jaw 51, namely an upper clamping jaw 51, is configured to be movable with respect to the first clamping jaw 50. The or each movable clamping jaw 51 is held by means of at least one spring element 52 under spring tension in a receiving position for receiving the breastbone crest 11 between the two clamping jaws 50, 51, the movable clamping jaw 51 being configured and adapted to be deflectable with respect to the fixed clamping jaw 50 against the spring force of the spring element 52 in a product-controlled manner. The spring element 52 is attached on the one hand to the movable clamping jaw 51 and on the other hand to the frame 23.

In the preferred embodiment, the two clamping jaws 50, 51 are formed by two separate sheet metal bodies which, in order to form a gap 53 for receiving the breastbone crest 11, are arranged with their thin edges 50.1, 51.1 opposite each other in such a manner that a breastbone 30 of the poultry carcass 12, which is transported parallel to the transport direction T, can be introduced into the gap 53 on a breastbone appendage 54 between the breastbone crest 11 and a breastbone web 55. In particular in FIG. 6, the breastbone appendage 54 is represented by an imaginary line which extends parallel to the transport direction T. It can be seen in FIG. 6 that the holding apparatus 15 with the support body 16 has the same orientation both in the region of the pre-detaching element 19 and in the region of the detaching element 20 when moved by the detaching unit 18, in such a manner that the breastbone 30 with the breastbone crest 11 is guided between the clamping jaws 50, 51 in parallel alignment with the transport direction T.

The clamping jaws 50, 51 or the sheet metal bodies are configured and adapted in such a manner that, in the receiving position, they are shaped so as to expand counter to the poultry bodies or parts thereof entering in transport direction T. The clamping jaws 50, 51 or the sheet metal bodies form an inlet or feed-in funnel tapering in transport direction T which virtually opens into the actual (guide) gap 53. In a feed-in area 56 of the clamping jaws 50, 51 or the sheet metal bodies, their distance from each other is greater than in a clamping area 57, in which the distance from each other, which can also be zero, defines the gap 53.

The movable clamping jaw 51 or the movable sheet metal body is configured and adapted to be rotatable about an axis of rotation D from a receiving position to a holding position and back. The sheet metal body of the movable clamping jaw 51 is shaped as a clamping bracket, the free ends of which are attached to or on a rotatable shaft 58. The shaft 58 itself is mounted on the housing, frame 23 or the like. The axis of rotation D of the movable clamping jaw 51 or the movable sheet metal body is oriented parallel to the transport direction T of the incoming poultry bodies or the parts thereof.

Figure 6:
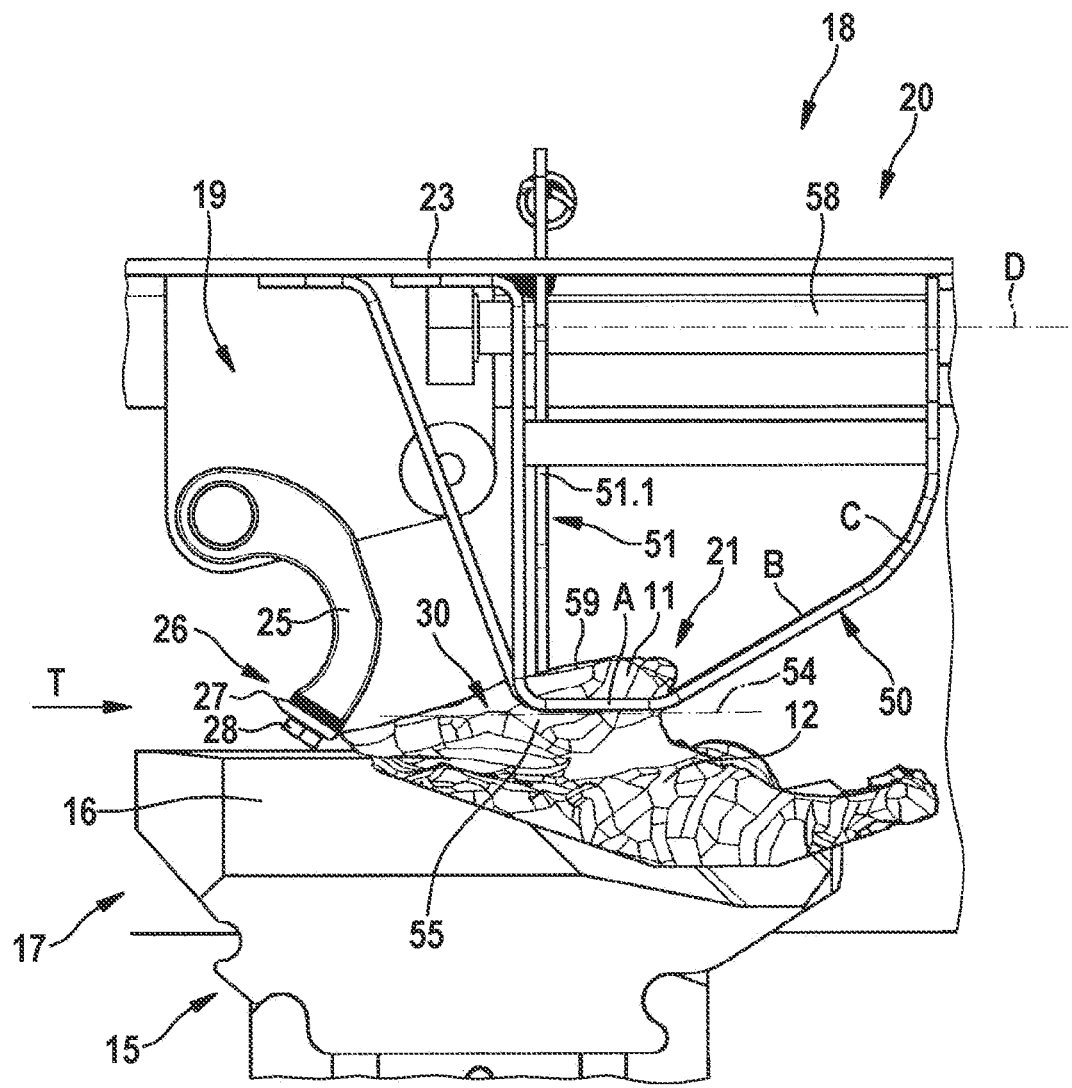
FIG. 6 a detaching unit with the detaching element according to FIG. 5.

As can be seen in particular from FIG. 6, the clamping jaws 50, 51 or the sheet metal bodies are oriented in transport direction T of the incoming poultry bodies or the parts thereof with a first portion A substantially parallel to the transport direction T and parallel to the breastbone appendage 54 between the breastbone crest 11 and the breastbone web 55, while at least one second portion B is oriented at an angle $\beta$ to the transport direction T and to the breastbone appendage 54 between the breastbone crest 11 and the breastbone web 55 with $\beta>0$ running away from a transport path defined by transport direction T of the poultry bodies or the parts thereof. Preferably, a third portion C of the clamping jaws 50, 51 or the sheet metal bodies is oriented at an angle $\alpha$ to the transport direction T and to the breastbone appendage 54 between the breastbone crest 11 and the breastbone web 55 with $\alpha>\beta$ running away from the transport path, the first and second and third portions A, B, C of a clamping jaw 50, 51 or a sheet metal body being each arranged one behind the other in transport direction T and being integrally connected to each other. The two clamping jaws 50, 51 or sheet metal bodies forming the detaching element 20 are configured to extend in alignment in transport direction T.

The apparatus 10 can be configured and adapted as an individual unit exclusively for obtaining the meat strip 13 from the breastbone crest 11. The detaching unit 18 is preferably only one of various processing stations of the apparatus 10. For example, a scoring unit for scoring the skin (not explicitly shown), a skinning unit 43 for removing the skin, a sinew separating unit 44, a unit 45 for separating the wishbones, a filleting unit 46 for detaching and separating the breast fillets from the poultry carcass 12, a unit 47 for recovering remainders of meat located laterally on the breastbone 30 and a unit 48 for recovering parts of the breastbone 30 which also comprise the cartilaginous regions of the breastbone or parts thereof can be provided as further processing stations for the apparatus 10. This ultimately forms a filleting machine 49 which can additionally include further processing stations.

The apparatus 10 and also the filleting machine 49 comprise a control unit, not explicitly shown, which is configured and adapted to control the conveyor 14 including the holding apparatus 15 comprising the support body 16 and the or each processing station 17. The control system can be used to control the driven functional parts of the apparatus 10 in coordination with each other.

The method according to the invention is described in greater detail below based on the drawing: The method is used for detaching meat strips 13, which are located on a breastbone crest 11 of a poultry carcass 12, from poultry carcasses 12 of slaughtered poultry bodies or parts thereof which are already freed from breast fillets. For detaching, each poultry carcass 12 is guided along a conveying path in transport direction T into the region of a detaching unit 18 for detaching the meat strip 13, the poultry carcass 12 being held during transport in transport direction T on a support body 16 of a holding apparatus 15 for holding the poultry carcass 12 during transport and during processing. During transport of the poultry carcass 12 into the work and operating area of the detaching unit 18, the longitudinal axis $L_{SK}$ of the support body 16 is oriented parallel to the transport direction T. In the case of a poultry carcass 12 oriented in such a manner, which is transported with its breastbone crest 11 through the detaching unit 18 in the longitudinal direction, the meat strip 13 is detached during transport along or through the detaching unit 18.

According to the invention, the meat strip 13 is detached from the breastbone crest 11 of the poultry carcass 12 by means of the detaching unit 18 in two separate and successive steps. In a first pre-detaching step, the meat strip 13 is pre-detached in the region of a breastbone horn 21 of the breastbone 30 preceding in transport direction T, in that the membrane on the breastbone horn 21 located between the meat and the breastbone 30 is cut into, while, in a second pre-detaching step, the free end of the meat strip 13 cut into is gripped and peeled off the breastbone crest 11 in the longitudinal direction thereof. The pre-detaching and detaching can be performed with a combination tool or with separate tools.

For the pre-detaching step, the incision in the meat strip 13 is made in the region of the breastbone horn 21 to pre-detach the meat strip 13 using a blade 27 at an acute angle $\beta$, which is formed between a longitudinal axis $L_{SK}$ of a support body 16 carrying the poultry carcass 12 and a longitudinal axis Lx of the blade 27 making the incision. In other words, the poultry carcass 12 runs with its breastbone horn 21 against the blade 27, causing the tip of the breastbone 30 or the meat strip 13 located on the breastbone crest 11 to be cut into in the region of the breastbone horn 21.

For this purpose, in its starting position, the blade 27 is brought into engagement with the breastbone horn 21 by transporting the poultry carcass 12 in transport direction T. The blade 27 is then guided in a product-controlled manner, the pressure of the blade 27 on the breastbone horn 21 increasing due to the further transport in transport direction T. The blade 27 is moved back to its starting position as soon as the blade 27 is out of engagement with the poultry carcass 12 due to the further transport in transport direction T. First, the blade 27 is deflected via a pivot lever 25 against a spring tension by the breastbone 30 of the poultry carcass 12. The spring tension ensures that the pivot lever 25 with the blade 27 is then moved back again to its starting position against an abutment. Loosening of the meat strip 13 is exclusively product-controlled, such that it works independently of size for both large and small poultry carcasses 12.

For the detaching step to detach the already pre-detached meat strip 13, the free end thereof is clamped between two tong jaws 32, 33 of gripping tongs 31, and the clamped meat strip 13 is stripped at least partially from the breastbone crest 11 in the longitudinal direction by a product-controlled deflector element 34. For this purpose, the poultry carcass 12 is transported further in transport direction T. The tong jaws 32, 33 of the gripping tongs 31 wait in an open standby position along the conveying route or conveying path until the tip of the breastbone 30, in the form of the breastbone horn 21 with the pre-detached meat strip 13, enters the open gripping tongs 31, in order to then move the tong jaws 32, 33 into their clamping position to clamp the free end of the meat strip 13. This is preferably done pneumatically. The tong jaws 32, 33 of the gripping tongs 31 are closed and opened by means of a pneumatic drive 41. The controlled closing and opening of the gripping tongs 31 takes place depending on the position of the holding apparatus 15. When the holding apparatus 15 has reached a specific position, the tong jaws 32, 33 are closed. Later, the tong jaws 32, 33 are opened again at another specific position to release the detached meat strip 13.

In the clamping position of the gripping tongs 31, they are moved away from the breastbone 30 via the deflector element 34 in a product-controlled manner. Thus, on the one hand, there is a relative movement due to transport of the poultry carcass 12 through the detaching unit 18, since the gripping tongs 31 are fixed in the transport direction T. On the other hand, a—preferably superimposed—relative movement takes place due to the pivoting movement of the gripping tongs 31 via the deflector element 34.

Thus, while the gripping tongs 31 or the two tong jaws 32, 33 are actively controlled closed and open along the conveying path depending on the position of the support body 16 carrying the poultry carcass 12 in order to clamp and detach the meat strip 13, the movement for detaching the meat strip 13 is product-controlled. The closed gripping tongs 31 clamping the meat strip 13 are moved away from the breastbone in a product-controlled manner namely during transport in transport direction T, in that the spring-loaded deflector element 34 is deflected by the breastbone 30 as soon as the breastbone 30 reaches the deflector element 34 until the meat strip 13 is at least partially detached from the breastbone crest 11. After at least partial detachment of the meat strip 13, the tong jaws 32, 33 are actively opened and the detaching element 20 formed of gripping tongs 31 and deflector element 34 is moved in a spring-loaded manner into its standby position with tong jaws 32, 33 open.

In the event that the meat strip 13 cannot be completely detached by the two aforementioned relative movements during a processing cycle before a subsequent holding apparatus 15 enters the work and operating area of the detaching unit 18, complete detachment of the meat strip 13 can be assisted and accelerated while the meat strip 13 is still clamped. One simple option, for example, is to provide an obstacle along the conveyor path. For example, the obstacle can be a simple spring-loaded flap against which the meat strip 13 that is still clamped is transported. Another option provides that the support body 16 with the meat strip 13 still clamped in the gripping tongs 31 is rotated about an axis of rotation $D_{SK}$, which is oriented transverse to the transport direction T, out of an alignment in which said support body is oriented with its longitudinal axis $L_{SK}$ parallel to the transport direction T of the holding apparatuses 15 for pre-detaching and peeling off the meat strip 13, in order to strip the pre-detached and at least partially detached meat strip 13 completely from the poultry carcass 12.

Alternatively, for the detaching step to detach the already pre-detached meat strip 13, the poultry carcass 12 can be inserted with the breastbone crest 11 between two clamping jaws 50, 51. When transporting the poultry carcass 12 in transport direction T, the orientation of the holding apparatus 15 and the support body remains the same, so that the poultry carcass 12 or its breastbone crest 11 is moved in parallel alignment with the transport direction T. In this case, the breastbone crest 11 enters between the two clamping jaws 50, 51. More precisely, the poultry carcass 12 is inserted with the region of a breastbone appendage 54 between the breastbone crest 11 and a breastbone web 55 parallel to the transport direction T into a gap 53 formed between two sheet metal bodies as clamping jaws 50, 51 so that the sheet metal bodies are located between the pre-detached meat strip 13 and the breastbone web 55. In other words, the breastbone web 55 is on one side of the clamping jaws 50, 51, while the breastbone crest 11 with the pre-detached meat strip 13 is located on the other side of the clamping jaws 50, 51. During transport of the poultry carcass 12 in transport direction T, the pre-detached meat strip 13 is initially moved by the sheet metal bodies towards a free edge 59 of the breastbone crest 11 and is ultimately stopped in transport direction T so that during further transport of the poultry carcass 12 in transport direction T, the meat strip 13 is held out of the detaching unit 18 and completely stripped off the breastbone crest 11. At least one sheet metal body is moved away from the second sheet metal body in a product-controlled manner so that the sheet metal bodies form a gap 53 between them and rest on the breastbone appendage 54 on both sides of the breastbone crest 11, the gap 53 between the two sheet metal bodies closing and holding the meat strip 13 as soon as the breastbone crest 11 leaves the detaching unit 18. Initially, in the receiving position, the sheet metal bodies lie against each other with their thin edges 50.1, 51.1, at least in the clamping area 57. In the feed-in area 56, the gap between the free edges 50.1, 51.1 is greater to facilitate "threading" of the breastbone crest 11 between the sheet metal bodies. When the breastbone crest 11 reaches the clamping area 57, the breastbone crest 11 lifts up the movable clamping jaw 51, i.e. the upper sheet metal body, so that the gap 53 between the sheet metal bodies opens. The poultry carcass 12 is guided along with the breastbone web 55 on the one side of the clamping jaws 50, 51 forming the detaching element 20, while the breastbone crest 11 with the pre-detached meat strip 13 is guided along on the other side of the clamping jaws 50, 51 forming the detaching element 20. During further transport, the breastbone crest 11 can leave the detaching element 20 through the gap 53, while the meat strip 13 is held tight by the detaching element 20 and prevented from further transport so that it is inevitably ripped off. The meat strips 13 held by the sheet metal bodies and completely detached from the breastbone are each pressed out of the holder by subsequently detached meat strips 13 and transported away.

The completely detached meat strips 13 are discharged from the apparatus 10 and further processed. For example, the detached meat strips 13 can drop onto a chute or the like, by means of which they are then fed into a transport container.

Especially preferably, the method is carried out using an apparatus 10 as disclosed herein.

The invention claimed is:

1. An apparatus configured and adapted for detaching meat strips, which are located on a breastbone crest of a poultry carcass, from poultry carcasses of slaughtered poultry bodies or parts thereof which are already freed from breast fillets, comprising:
   a circulating conveyor having at least one holding apparatus with a support body for receiving and holding the poultry bodies or the parts thereof during transport by the apparatus in a transport direction T; and
   at least one processing station along a conveying path of the conveyor, wherein one of the processing stations is configured as a detaching unit for detaching the meat strips from the breastbone crest;
   wherein the detaching unit comprises a pre-detaching element and a detaching element, wherein the pre-detaching element configured and adapted to cut into the meat strip in a region of a breastbone horn of the breastbone crest which leads in the transport direction T and the detaching element is configured and adapted to grip and peel the meat strip off the breastbone crest.

2. The apparatus according to claim 1, wherein the pre-detaching element and the detaching element are separate tools which are configured and adapted to carry out separate work steps that are performed one after the other and are arranged one behind the other in the transport direction T.

3. The apparatus according to claim 1, wherein the pre-detaching element and the detaching element are arranged on a common main body, the detaching element being arranged downstream of the pre-detaching element in the transport direction T.

4. The apparatus according to claim 3, wherein the pre-detaching element comprises a pivot lever on a free end of which a blade is arranged, the pivot lever being mounted on the main body such that it pivots about a pivot axis SAE.

5. The apparatus according to claim 4, wherein the blade is releasably attached to the pivot lever.

6. The apparatus according to claim 4, wherein the pivot lever is spring-loaded against an adjustable abutment in a starting position such that the breastbone of the poultry carcasses transported along the transport path in the transport direction T inevitably comes into engagement with the pivot lever which is in the starting position and its blade arranged thereon by means of the conveyor.

7. The apparatus according to claim 6, wherein the blade on the free end of the pivot lever is oriented in the starting position of said pivot lever at an angle β to the poultry carcass to be processed, such that a tip of the blade is directed towards the breastbone horn.

8. The apparatus according to claim 7, wherein the angle β enclosed between a longitudinal axis LSK of the support body and a longitudinal axis LK of the blade is greater than 0° and less than 90° or between 20° and 60° or is approximately 45°.

9. The apparatus according to claim 6, wherein the pivotably mounted and spring-loaded pivot lever is configured to be deflectable against the spring force in a product-controlled manner.

10. The apparatus according to claim 3, wherein the detaching element is mounted on the main body such that it is pivotable about a pivot axis SGA.

11. The apparatus according to claim 10, wherein the deflector element is mounted on the main body such that it is pivotable about a pivot axis SGA and the pair of tong jaws is mounted on the deflector element such that it can pivot about a pivot axes SZB with respect to the deflector element, wherein the pivot axes SZB of the tong jaws are aligned substantially transverse to the pivot axis SGA of the deflector element.

12. The apparatus according to claim 11, further comprising a pneumatic drive for pneumatically opening and closing the tong jaws associated with the gripping tongs, wherein pivoting movements of the tong jaws is executed towards each other and away from each other with respect to the deflector element.

13. The apparatus according to claim 10, wherein the pivot axes SAE of the pre-detaching element and SGA of the detaching element are oriented transverse to the transport direction T.

14. The apparatus according to claim 1, wherein the support body is rotatable about an axis of rotation DSK, which is oriented essentially transverse to the transport direction T, and has a position in a region of the detaching unit in which a longitudinal axis LSK of the support body is oriented parallel to the transport direction T.

15. The apparatus according to claim 1, wherein the detaching element comprises gripping tongs with a pair of tong jaws and a deflector element, the gripping tongs being arranged upstream of the deflector element in the transport direction T.

16. The apparatus according to claim 15, wherein the detaching element is spring-loaded against an adjustable abutment in a starting position, such that the breastbone of the poultry carcasses transported by the conveyor along the transport path in the transport direction T inevitably comes into engagement with the detaching element which is in the starting position.

17. The apparatus according to claim 16, wherein the pivotably mounted and spring-loaded detaching element is configured to be deflectable against the spring force in a product-controlled manner.

18. The apparatus according to claim 16, wherein the two tong jaws have profiling on their inner surfaces directed towards each other, the profiling being formed from a longitudinal section of the inner surfaces, such that profiled grooves in the starting position of the detaching element extend substantially parallel to a longitudinal axis LSK of the support body or substantially parallel to the transport direction T.

19. The apparatus according to claim 16, wherein a spring force of the pre-detaching element and/or the spring force of the detaching element is adjustable.

20. The apparatus according to claim 1, further comprising a flap element which is spring-loaded and arranged along the transport path such that the flap element is brought into engagement with the meat strip when the meat strip is already partially peeled off the breastbone crest.

21. The apparatus according to claim 1, wherein the detaching element comprises two clamping jaws, at least one of the clamping jaws being configured to be movable with respect to the second clamping jaw.

22. The apparatus according to claim 21, wherein a first one of the clamping jaws is configured to be fixed and stationary, and a second one of the clamping jaws is configured to be movable with respect to the first clamping jaw.

23. The apparatus according to claim 21, wherein the or each movable clamping jaw is held by at least one spring element under spring tension in a receiving position for receiving the breastbone crest between the two clamping jaws, the or each movable clamping jaw configured and adapted to be deflectable against the spring force of the spring element in a product-controlled manner.

24. The apparatus according to claim 23, wherein the clamping jaws are configured and adapted such that, in the receiving position, they are shaped so as to expand counter to the poultry bodies or parts thereof entering in the transport direction T.

25. The apparatus according to claim 21, wherein the two clamping jaws are formed by two separate sheet metal bodies which, in order to form a gap for receiving the breastbone crest, are arranged with thin edges thereof opposite each other such that a breastbone of the poultry carcass (12), which is transported parallel to the transport direction T, is introduced into the gap on a breastbone appendage between the breastbone crest and a breastbone web.

26. The apparatus according to claim 25, wherein the sheet metal bodies are oriented in the transport direction T of the incoming poultry bodies or the parts thereof with a first portion of one of the sheet metal bodies substantially parallel to the transport direction T and parallel to the breastbone appendage between the breastbone crest and the breastbone web, while at least one second portion of the one of the sheet metal bodies is oriented at an angle β to the transport direction T and to the breastbone appendage between the breastbone crest and the breastbone web with β>0 running away from a transport path defined by transport direction T of the poultry bodies or the parts thereof.

27. The apparatus according to claim 26, wherein a third portion of the one of the sheet metal bodies is oriented at an angle α to the transport direction T and to the breastbone appendage between the breastbone crest and the breastbone web with α>β running away from the transport path, wherein the first and second and third portions are each arranged one behind the other in the transport direction T and are integrally connected to each other.

28. The apparatus according to claim 21, wherein the movable clamping jaw is configured and adapted to be rotatable about an axis of rotation D from a receiving position to a holding position and back.

29. The apparatus according to claim 28, wherein the axis of rotation D of the movable clamping jaw is oriented parallel to the transport direction T of the incoming poultry bodies or the parts thereof.

30. The apparatus according to claim 21, wherein the two clamping jaws forming the detaching element are configured to extend in alignment in the transport direction T.

31. The apparatus according to claim 1, further comprising further processing stations each configured as a unit selected from a scoring unit for scoring the skin, a skinning unit for removing the skin, a sinew separating unit, a unit for separating wishbones, a filleting unit for detaching and separating the breast fillets from the poultry carcass, a unit for recovering remainders of meat located laterally on the breastbone and a unit for recovering parts of the breastbone which also comprise the cartilaginous regions of the breastbone or parts thereof.

32. The apparatus according to claim 1, further comprising a control unit configured and adapted to control the conveyor including the holding apparatus comprising the support body (16) and the or each processing station.

33. A method for detaching meat strips, which are located on a breastbone crest of a poultry carcass, from poultry carcasses of slaughtered poultry bodies or parts thereof which are already freed from breast fillets, comprising the steps:
feeding the poultry carcass along a conveying path in a transport direction T into a region of a detaching unit for detaching the meat strip, wherein the poultry carcass is held during transport in the transport direction T on a support body of a holding apparatus for holding the poultry carcass during transport and during processing, wherein a longitudinal axis LSK of the support body is oriented parallel to the transport direction T; and
detaching the meat strip during transport along or through the detaching unit;
wherein the meat strip is detached from the breastbone crest of the poultry carcass by the detaching unit in two separate and successive steps.

34. The method according to claim 33, wherein:
in a first pre-detaching step of the two separate and successive steps, the meat strip is pre-detached in a region of a breastbone horn of a breastbone preceding in the transport direction T; and
the membrane on the breastbone horn located between the meat and the breastbone is cut into, while in a second detaching step of the two separate and successive steps, the free end of the meat strip cut into is gripped and peeled off the breastbone crest in a longitudinal direction thereof.

35. The method according to claim 34, wherein, for the pre-detaching step, the incision in the meat strip is made in the region of the breastbone horn to pre-detach the meat strip using a blade at an acute angle β, which is formed between a longitudinal axis LSK of a support body carrying the poultry carcass and a longitudinal axis LK of a blade making the incision.

36. The method according to claim 35, wherein, in a starting position of the blade, the blade is brought into engagement with the breastbone horn by transporting the poultry carcass in the transport direction T, and the blade is then guided in a product-controlled manner, wherein a pressure of the blade on the breastbone horn increases due to the further transport in the transport direction T, and the blade is moved back to its starting position as soon as the blade is out of engagement with the poultry carcass due to the further transport in the transport direction T.

37. The method according to claim 36, wherein the blade is deflected via a pivot lever against a spring tension by the breastbone of the poultry carcass in order to be moved out of engagement by the spring tension back to its starting position against an abutment.

38. The method according to claim 34, wherein for the detaching step to detach the already pre-detached meat strip, the free end of the meat strip is clamped between two tong jaws of gripping tongs, and the clamped meat strip is stripped at least partially from the breastbone crest in the longitudinal direction by a product-controlled deflector element.

39. The method according to claim 38, wherein the tong jaws of the gripping tongs are closed and opened by a pneumatic drive, wherein the gripping tongs in their clamping position are moved away from the breastbone in a product-controlled manner via the deflector element.

40. The method according to claim 39, wherein the gripping tongs or the two tong jaws are actively controlled closed and open along the conveying path depending on a position of the support body carrying the poultry carcass.

41. The method according to claim 39, wherein the closed gripping tongs clamping the meat strip are moved away from the breastbone in a product-controlled manner during transport in the transport direction T, the spring-loaded deflector element being deflected by the breastbone as soon as the breastbone reaches the deflector element until the meat strip is at least partially detached from the breastbone crest.

42. The method according to claim 38, wherein, after at least partial detachment of the meat strip, the tong jaws are actively opened and a detaching element formed of the gripping tongs and deflector element is moved in a spring-loaded manner into its standby position with the tong jaws open.

43. The method according to claim 38, wherein the support body with the meat strip still clamped in the gripping tongs is rotated about an axis of rotation DSK, which is oriented transverse to the transport direction T, out of an alignment in which said support body is oriented with its longitudinal axis LSK parallel to the transport direction T of the holding apparatuses for pre-detaching and peeling off the meat strip, in order to strip the pre-detached and at least partially detached meat strip completely from the poultry carcass.

44. The method according to claim 38, wherein the tong jaws of the gripping tongs wait in an open standby position along the conveying path until a tip of the breastbone, in a form of the breastbone horn with the pre-detached meat strip, enters the open gripping tongs, in order to then move the tong jaws in a pneumatically controlled manner into their clamping position to clamp the free end of the meat strip.

45. The method according to claim 33, wherein for the detaching step to detach an already pre-detached meat strip, the poultry carcass is inserted with the breastbone crest between two clamping jaws.

46. The method according to claim 45, wherein the poultry carcass is inserted with a region of a breastbone appendage between the breastbone crest and a breastbone web parallel to the transport direction T into a gap formed between two sheet metal bodies as clamping jaws so that the sheet metal bodies are located between the pre-detached meat strip and the breastbone web.

47. The method according to claim 46, wherein during transport of the poultry carcass in the transport direction T, the pre-detached meat strip is initially moved by the sheet metal bodies towards a free edge of the breastbone crest and is ultimately stopped in the transport direction T so that during further transport of the poultry carcass in the transport direction T, the meat strip is held out of the detaching unit and completely stripped off the breastbone crest.

48. The method according to claim 47, wherein the meat strips held by the sheet metal bodies and completely detached from the breastbone are each pressed out of the holder by subsequently detached meat strips and transported away.

49. The method according to claim 46, wherein at least one of the sheet metal bodies is moved away from a second of the sheet metal bodies in a product-controlled manner so that the sheet metal bodies form a gap between them and rest on the breastbone appendage on both sides of the breastbone crest, wherein the gap between the two sheet metal bodies closes and holds the meat strip as soon as the breastbone crest leaves the detaching unit.

50. The method according to claim 33, wherein the method is carried out with an apparatus configured and adapted for detaching meat strips, which are located on a breastbone crest of a poultry carcass, from poultry carcasses of slaughtered poultry bodies or parts thereof which are already freed from breast fillets, the apparatus comprising:
a circulating conveyor having at least one holding apparatus with a support body for receiving and holding the poultry bodies or the parts thereof during transport by the apparatus in a transport direction T; and
at least one processing station along a conveying path of the conveyor, wherein one of the processing stations is configured as a detaching unit for detaching the meat strips from the breastbone crest;
wherein the detaching unit comprises a pre-detaching element and a detaching element, wherein the pre-detaching element configured and adapted to cut into the meat strip in a region of a breastbone horn of the breastbone crest which leads in the transport direction T and the detaching element is configured and adapted to grip and peel the meat strip off the breastbone crest.

* * * * *